(No Model.)
F. A. HALL.
FRUIT GATHERER.
No. 390,165. Patented Sept. 25, 1888.
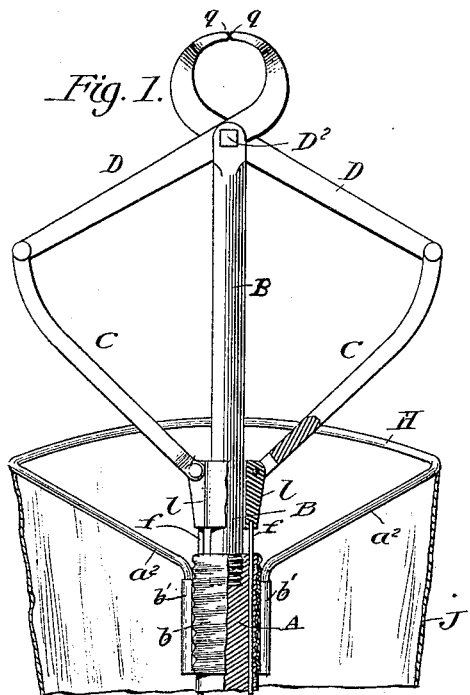
Fig. 1.
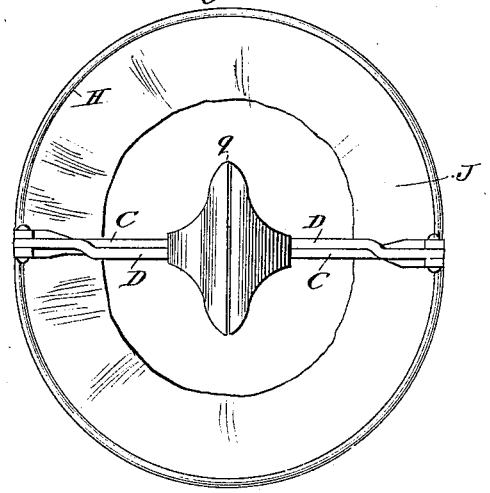
Fig. 2.
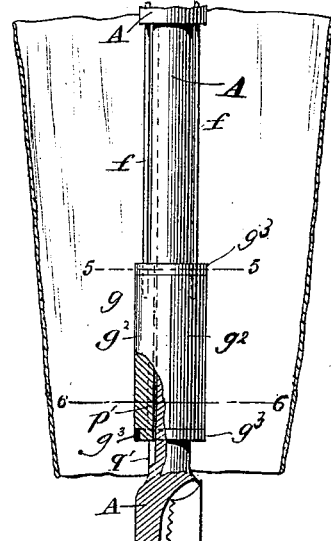
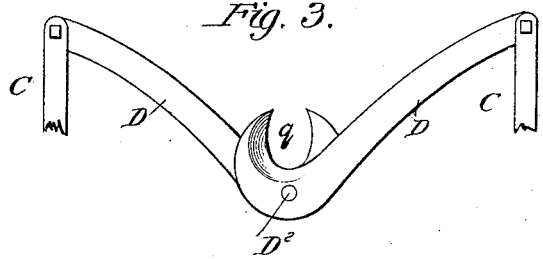
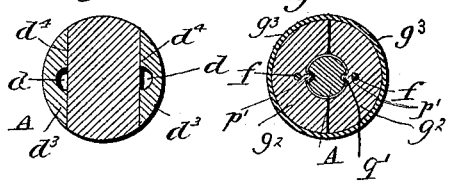
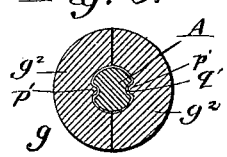
WITNESSES:
J. E. Clark
C. Sedgwick Jr.
INVENTOR:
F. A. Hall
BY Munn & Co.
ATTORNEYS.

UNITED STATES PATENT OFFICE.

FRANCIS ASBURY HALL, OF ENNIS, TEXAS, ASSIGNOR OF ONE-HALF TO WILLIAM H. FEARS, OF SAME PLACE.

FRUIT-GATHERER.

SPECIFICATION forming part of Letters Patent No. 390,165, dated September 25, 1888.

Application filed October 4, 1887. Serial No. 251,420. (No model.)

*To all whom it may concern:*

Be it known that I, FRANCIS ASBURY HALL, of Ennis, in the county of Ellis and State of Texas, have invented a new and Improved Fruit-Gatherer, of which the following is a full, clear, and exact description.

My invention is an improvement in devices for severing fruit from trees and carrying it therefrom down to a basket or other suitable receptacle. The construction and combination of parts are as hereinafter described and claimed.

In the accompanying drawings, Figure 1 is a longitudinal section of the implement provided with horizontal jaws for severing fruit from tree-branches and a guide-tube for carrying it to a receptacle. Fig. 2 is a plan view of the same. Fig. 3 is a side view of the modification of the fruit-severing jaws, the latter being arranged vertically. Fig. 4 is a cross-section illustrating a modified construction of the pole of the implement, and Figs. 5 and 6 are respectively cross-sections on lines 5 5 and 6 6 of Fig. 1.

The pole is made in two parts or sections, A and B, which are connected by a screw-threaded joint. To the upper end of the smaller or top section, B, are pivoted by bolt $D^2$ the cutting devices, which consist of curved horizontal jaws having meeting nipping-edges $q$ and long divergent arms D. These latter may project laterally downward, as shown in Fig. 1, or laterally upward, as in Fig. 3. The latter figure also shows shear-cutters in place of nippers. Links C connect the lower outer ends of arms D to a sleeve or collar, $l$, that slides freely on the upper section, B, of the pole. From this sleeve $l$ small rods $f$ extend down alongside the pole and are attached to a sleeve or collar, $g$, that slides on the lower section or body, A. This sleeve $g$ is divided centrally and longitudinally, its halves $g^2 g^2$ being held together by rings $g^3$. In order to prevent the sleeve $g$ from rotating on the pole, the latter is provided with lengthwise grooves $q'$, and the sleeve has internal projections, $p'$, that enter said grooves, as shown in Figs. 5 and 6.

The upper ends of rods $f$ slide in holes formed in an enlarged or thickened portion of pole-section A, which serves as a guide for them, as will be readily understood; but I may in some cases make the section A with flat sides $d^4$, as shown in sectional view, Fig. 4, and then the rods $f$ will be arranged to slide in grooves $d$, formed in the inner flat sides of longitudinal strips $d^3$, which are applied to the said flat sides $d^4$ of the body A.

It is obvious that by sliding the sleeve $g$ alternately up and down in pole-section A the nippers $q$ will be alternately opened and closed, as required for severing fruit from trees.

I will now describe the attachment for receiving the fruit thus severed. It consists of a canvas tube, J, a metal frame, H, and an adjustable sleeve, $b$. The pole extends longitudinally through the tube J, as shown in Fig. 1, the said tube extending down a short distance (in practice two to four inches) below the sleeve $g$. The frame H is arranged below the links C, and formed of a ring having inwardly-projecting arms $a^2$, and the sleeve $b$ has vertical exterior sockets, $b'$, to receive the ends of said arms $a^2$, as shown in Fig. 1. The tube J is attached to the ring H, and the latter may be adjusted higher or lower on the pole by rotating the sleeve $b$. This result is provided for by constructing the sleeve with a coarse screw-thread and fitting it on the enlarged upper portion of pole-section A, which is threaded correspondingly.

In using the implement the operator grasps the butt of the pole with one hand and with the other he seizes the bottom end of tube J and the lower portion of the sleeve $g$, which latter is thus temporarily confined to and around the sleeve. The latter is then slid upward to open the jaws $q$ and downward to close them and sever the fruit, which is received in the wide mouth of the tube and descends through it. The operator releases the lower end of the tube in time to receive the fruit in his open hand and then deposits it in a basket or other suitable receptacle.

A saw-blade, E, is pivoted at its lower end in a lengthwise slot, $u$, formed in the butt of section A. It may be turned on its pivot $v$ out of said slot when required for use in sawing off limbs of trees. It is held closed or extended for use by means of a stud, $x$, attached to a spring-plate, y, which is secured to the butt, said stud entering the notches w w' formed in opposite edges of the saw-blade.

What I claim is—

1. In a fruit-gatherer, the combination of the pole, the jaws pivoted to its upper end, the sliding collar, the links connecting the jaws and collar, the sleeve, the open ring encircling the pole and attached thereto below the said jaws, and the flexible tube J, attached to said ring and inclosing the pole, as shown and described.

2. In a fruit-gatherer, the combination of the pole, the jaws attached to its upper end, the sliding collar, the links connecting the collar and the sleeve, the rods, the jaws, the ring H, the tube J, attached thereto and encircling the pole below said jaws, and the sleeve which supports the ring and is adjustable on the pole longitudinally for the purpose of adjusting the mouth of said tube in the desired proximity to the said jaws, substantially as specified.

3. In a fruit-gatherer, the combination of the pole, the jaws attached to the upper end, the sliding collar, the links connecting the collar and the jaws, the sleeve, the rods, the ring H, the tube J, encircling the pole below said jaws, and the adjustable sleeve, which supports said ring and is screw-threaded and applied to a threaded portion of the pole, as shown and described, and for the purpose specified.

4. The combination, with the pole, of the pivoted fruit-severing jaws, the links C, attached thereto, sliding collar $l$, rods $f$, and pole-section A, having lengthwise grooves, of the sliding sleeve $g$, made in longitudinal halves secured together by rings $g^3$ and having projections that enter and slide in said grooves, as shown and described.

FRANCIS ASBURY HALL.

Witnesses:
C. M. BANNER,
M. LATIMER.